United States Patent
Walters et al.

(10) Patent No.: US 6,816,782 B1
(45) Date of Patent: Nov. 9, 2004

(54) APPARATUS, SYSTEMS AND METHODS FOR NAVIGATION DATA TRANSFER BETWEEN PORTABLE DEVICES

(75) Inventors: Thomas H. Walters, Gardner, KS (US); Jay Dee Krull, Olathe, KS (US); Ronald B. Kabler, Olathe, KS (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 10/268,859

(22) Filed: Oct. 10, 2002

(51) Int. Cl.[7] ............................................. G01C 21/00
(52) U.S. Cl. ..................................... 701/209; 340/995
(58) Field of Search ................................ 701/209, 208, 701/210; 455/90.1, 456.1, 12.1; 340/995, 990; 342/357.1

(56) References Cited

U.S. PATENT DOCUMENTS

| | | |
|---|---|---|
| 3,063,048 A | 11/1962 | Lehan et al. |
| 4,445,118 A | 4/1984 | Taylor et al. |
| 4,884,132 A | 11/1989 | Morris et al. |
| 5,043,736 A | 8/1991 | Darnell et al. |
| 5,119,504 A | 6/1992 | Durboraw, III |
| 5,208,756 A | 5/1993 | Song ........................ 455/456.3 |
| 5,223,844 A | 6/1993 | Mansell et al. |
| 5,235,633 A | 8/1993 | Dennison et al. |
| 5,301,368 A | 4/1994 | Hirata |
| 5,334,974 A | 8/1994 | Simms et al. |
| 5,043,736 A | 9/1994 | Darnell et al. |
| 5,345,244 A | 9/1994 | Gildea et al. |
| 5,355,511 A | 10/1994 | Hatano et al. |
| 5,364,093 A | 11/1994 | Huston et al. |
| 5,365,450 A | 11/1994 | Schuchman et al. |
| 5,379,224 A | 1/1995 | Brown et al. |
| 5,389,934 A | 2/1995 | Kass |
| 5,408,238 A | 4/1995 | Smith |
| 5,414,432 A | 5/1995 | Penny et al. |
| 5,434,789 A | 7/1995 | Fraker et al. |
| 5,448,773 A | 9/1995 | McBurney et al. |
| 5,469,175 A | 11/1995 | Boman |
| 5,506,587 A | 4/1996 | Lans |
| 5,528,248 A | 6/1996 | Steiner et al. ............... 342/357 |

(List continued on next page.)

FOREIGN PATENT DOCUMENTS

| | | |
|---|---|---|
| EP | 0123562 | 10/1984 |
| EP | 0242099 | 4/1987 |
| FR | 2541801 | 2/1983 |

OTHER PUBLICATIONS

Inoue et al., 2002/0169551 A1, Navigation system, handheld terminal, data transfer system and program executed therein, Nov. 14, 2002.*

(List continued on next page.)

Primary Examiner—Marthe Y. Marc-Coleman
(74) Attorney, Agent, or Firm—Devon A. Rolf

(57) ABSTRACT

Apparatus, systems, and methods for navigation data transfer between portable devices are provided. A handheld electronic device is provided which includes a processor and a memory adapted to communicate with the processor. The memory is adapted to store navigation related data. The navigation related data includes cartographic data including a number of locations and data indicative of thoroughfares of a plurality of types connecting certain ones of the locations. The memory is further adapted to store software including software operable to perform navigation applications such as routing algorithms. The handheld electronic device includes a transceiver. The transceiver is adapted to transmit and receive the navigation related data and applications wirelessly between an other portable electronic device and/or larger clients such as a remote server.

50 Claims, 8 Drawing Sheets

U.S. PATENT DOCUMENTS

| | | | |
|---|---|---|---|
| 5,539,398 A | 7/1996 | Hall et al. | |
| 5,555,286 A | 9/1996 | Tendler | |
| 5,570,095 A | 10/1996 | Drouilhet et al. | |
| 5,650,770 A | 7/1997 | Schlager et al. | |
| 5,689,269 A | 11/1997 | Norris | |
| 5,689,809 A | 11/1997 | Grube et al. | 455/457 |
| 5,712,899 A | 1/1998 | Pace, II | |
| 5,781,150 A | 7/1998 | Norris | |
| 5,786,789 A | 7/1998 | Janky | 342/357.1 |
| 5,804,810 A | 9/1998 | Woolley et al. | |
| 5,826,195 A | 10/1998 | Westerlage et al. | |
| 5,848,373 A | 12/1998 | DeLorme et al. | 701/200 |
| 5,877,724 A | 3/1999 | Davis | |
| 5,890,070 A | 3/1999 | Hamada | |
| 5,892,441 A | 4/1999 | Woolley et al. | |
| 5,914,675 A | 6/1999 | Tognazzini | |
| 5,929,752 A | 7/1999 | Janky et al. | |
| 5,938,721 A | 8/1999 | Dussell et al. | 701/211 |
| 5,952,959 A | 9/1999 | Norris | |
| 5,963,130 A | 10/1999 | Schlager et al. | |
| 6,002,982 A | 12/1999 | Fry | |
| 6,005,513 A | 12/1999 | Hardesty | |
| 6,011,510 A | 1/2000 | Yee et al. | |
| 6,046,688 A | 4/2000 | Higashikata et al. | |
| 6,085,090 A | 7/2000 | Yee et al. | |
| 6,111,539 A | 8/2000 | Mannings et al. | |
| 6,124,826 A | 9/2000 | Garthwaite et al. | |
| 6,144,336 A | 11/2000 | Preston et al. | |
| 6,148,262 A | 11/2000 | Fry | |
| 6,166,626 A | 12/2000 | Janky et al. | |
| 6,182,006 B1 | 1/2001 | Meek | 701/200 |
| 6,236,338 B1 | 5/2001 | Hamada | |
| 6,240,276 B1 | 5/2001 | Camp, Jr. | |
| 6,246,376 B1 | 6/2001 | Bork et al. | |
| 6,266,612 B1 | 7/2001 | Dussell et al. | 701/207 |
| 6,275,707 B1 | 8/2001 | Reed et al. | |
| 6,278,402 B1 | 8/2001 | Pippin | |
| 6,295,449 B1 | 9/2001 | Westerlage et al. | |
| 6,373,430 B1 | 4/2002 | Beason et al. | 342/357.09 |
| 6,374,179 B1 | 4/2002 | Smith et al. | |
| 6,389,291 B1 | 5/2002 | Pande et al. | |
| 6,411,899 B2 | 6/2002 | Dussell et al. | 701/211 |
| 6,421,608 B1 | 7/2002 | Motoyama et al. | |
| 6,456,938 B1 * | 9/2002 | Barnard | 701/213 |
| 6,470,267 B1 * | 10/2002 | Nozaki | 701/209 |
| 6,492,941 B1 | 12/2002 | Beason et al. | |
| 6,518,919 B1 | 2/2003 | Durst et al. | |
| 6,529,824 B1 * | 3/2003 | Obradovich et al. | 701/208 |
| 2003/0001742 A1 * | 1/2003 | Eshelman et al. | 340/573.1 |
| 2003/0080897 A1 | 5/2003 | Tranchina | 342/357.1 |
| 2003/0092433 A1 * | 5/2003 | Flannery | 455/416 |
| 2003/0139150 A1 * | 7/2003 | Rodriguez et al. | 455/90 |

OTHER PUBLICATIONS

Office Action dated Nov. 19, 2003; Ser. No. 10/289,666; Filed Nov. 7, 2002; Walters, Thomas H.

"Tendler Updates FoneFinder", Jun. 28, 1999 *Wireless Week*.

"Automatic Vehicle Monitoring" by J.S. Bravman et al., Fairchild Space & Electronics, Co., Germantown, MD.

"Application of the Global–Positioning System (GPS) to Automatic Vehicle Monitoring"—1981 Carnahan Conference on Crime Countermeasures, University of Kentucky, Lexington, May 13–15, 1981.

Tranchina et al., 2003/0080897 A1, Mobile Radio With GPS Capability.

"AX.25 Amateur Packet–Radio Link–Layer Protocol", Version 2.2, Nov., 1997 from http://www.tapr.org.

APRS Guide—"The Automatic Position Reporting System", compiled from a series of articles by Arte Booten, from http://www.oarc.net.

Eshelman et al., 2003/0001742 A1, Electronic Assistant Incorporated in Personal Objects, Jan. 2, 2003.

U.S. patent application Ser. No. 10/289,666, Walters, et al., filed Nov. 7, 2002.

* cited by examiner

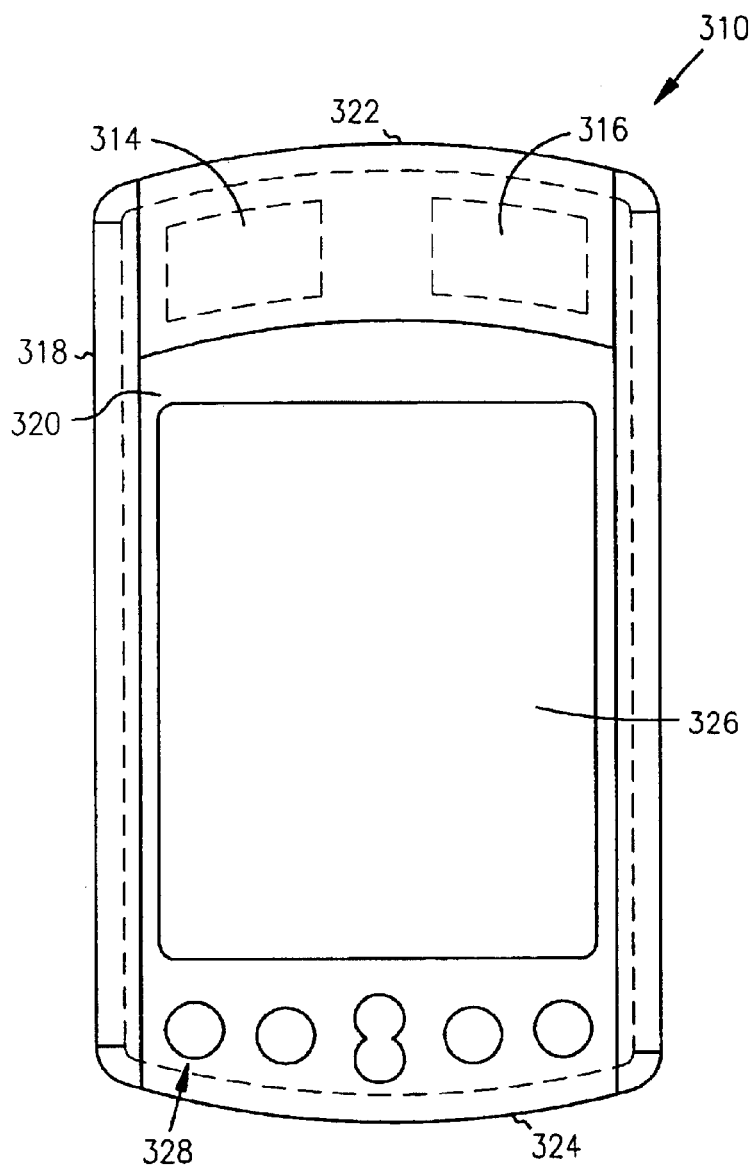
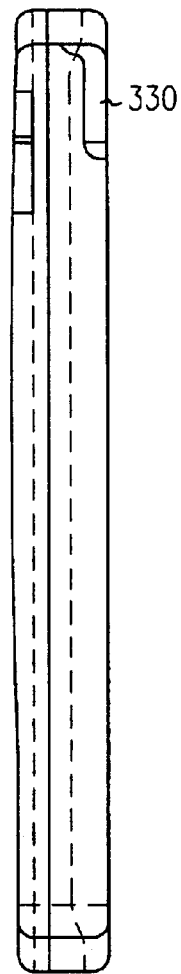
FIG. 3A　　　　　　　　　　FIG. 3B
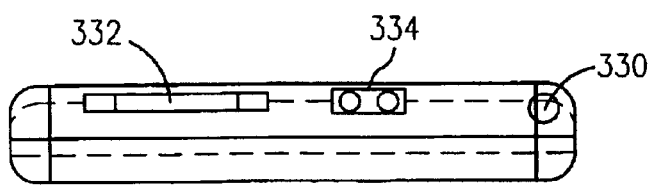
FIG. 3C

APPARATUS, SYSTEMS AND METHODS FOR NAVIGATION DATA TRANSFER BETWEEN PORTABLE DEVICES

FIELD OF THE INVENTION

The present invention relates generally to navigational devices, and in particular to systems and methods for navigation data transfer between portable devices.

BACKGROUND OF THE INVENTION

A number of electronic devices used in combination with software applications and positioning systems provide navigation information to users of the devices. For example, electronic devices used within transportation vehicles provide positioning information associated with geographic locations of the devices. These same devices also provide displays that provide visual information to the users of the devices. Some devices can communicate audibly with their users. Moreover, the devices are equipped with software applications to provide routing information. However by and large, the devices are stand-alone devices providing primarily only navigation information to that particular device.

Electronic navigation devices employing Global Positioning System ("GPS") receivers are known. The GPS includes a plurality of satellites that are in orbit about the Earth. The orbit of each satellite is not necessarily synchronous with the orbits of other satellites and, in fact, is likely asynchronous. The GPS receiver device receives spread spectrum GPS satellite signals from the various satellites. The spread spectrum signals continuously transmitted from each satellite utilize a highly accurate frequency standard accomplished with an extremely accurate atomic clock. Each satellite, as part of its data signal transmission, transmits a data stream indicative of that particular satellite. The GPS receiver device acquires spread spectrum GPS satellite signals from at least three satellites to calculate its two-dimensional position by triangulation. Acquisition of an additional signal, resulting in signals from a total of four satellites, permits the GPS receiver device to calculate its three-dimensional position. In this manner, an electronic navigation device employing a GPS receiver has the ability to accurately compute the position of the device in real time, even as the device moves. One example of a GPS electronic navigation device is the eMAP portable electronic map manufactured by Garmin International.

Although GPS enabled devices are often used to describe navigation devices, it will be readily appreciated that satellites need not be used at all to determine a geographic position of a receiving unit, since cellular towers or any customized transmitting radio frequency towers can be deployed and combined in groups of three or more. With such a configuration, any standard geometric triangulation algorithm can be used to determine an approximate location of the receiving unit.

In recent years, attempts have been made to combine navigation and geographic positioning services on other types of multipurpose devices, e.g. PDAs, cell phones and other intelligent appliances/apparel of the like. PDAs, for example, are small, substantially hand-held computers that are used for storing, manipulating and retrieving data. One example of a PDA is the Palm Pilot® manufactured by 3Com Corporation. PDAs provide a variety of functions, such as an electronic day planner, an address book, a to do list, and a memo pad. Among many PDA products there exist the capability to wirelessly transfer certain PDA applications from one PDA to another. For example, some PDAs are capable of transferring an address book, "to-do" list or other application from one PDA to another using infra-red frequency signals.

Plug-in GPS receiver modules for PDAs are known. However, there are problems associated with various plug-in GPS receiver modules and PDAs. One problem is that a PDA with a plug-in GPS receiver module is cumbersome to handle and use since two separate devices must be handled. Additionally, the accuracy of the geographic positioning services have not to date been as dependable as exists for dedicated electronic navigation devices.

In currently existing plug-in devices, the plug-in GPS receiver module and the PDA do not function together to provide integrated PDA features. Moreover, even with the plug-in, such devices are stand alone and do possess the capability to share geographic positioning information or navigation applications and services with another device. For example, even those PDAs which include plug-in GPS receiver modules are not capable of transmitting navigation related data from one PDA to another.

Therefore, there exists a need for a portable electronic device that incorporates GPS receiver technology with other handheld device functionality, e.g. PDA applications. Such a GPS/multipurpose device should fully the integrate GPS capabilities into say PDA or cell phone functions within a single module such that the GPS/multipurpose device is not cumbersome to handle or to use. And, there further exists a need for an integrated GPS/multipurpose device which is able to wirelessly transmit navigation related data from one such device to another thereby providing enhanced flexibility and utility in accessing and sharing navigation applications between devices.

SUMMARY OF THE INVENTION

The above mentioned problems of combining navigation and geographic positioning services on other types of multipurpose devices and wirelessly transmitting navigation related data from one such device to another are addressed by the present invention and will be understood by reading and studying the following specification. Apparatus, systems and methods for wireless navigation data transfer between portable devices are provided.

In one embodiment of the present invention, a handheld electronic device is provided which includes a processor and a memory adapted to communicate with the processor. The handheld electronic device includes navigation capabilities and navigation related data. In some embodiments the navigation related data includes one or more navigation applications, one or more waypoints, one or more planned routes, one or more track logs, one or more track logs, and the like. According to the teachings of the present invention, the handheld device includes a transceiver which is operable to transmit the navigation related data wirelessly to other handheld electronic devices. That is, in some embodiments, the handheld device is operable for transferring one or more navigation applications, one or more waypoints, one or more planned routes, one or more track logs, one or more track logs, and the like to another handheld device. The memory is adapted to store navigation related data. The navigation related data includes cartographic data including a number of locations and data indicative of thoroughfares of a plurality of types connecting certain ones of the locations. The memory is further adapted to store software including software operable to perform routing algorithms.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIGS. 3A–3C illustrate views for another embodiment of an electronic navigational device according to the teachings of the present invention;

DETAILED DESCRIPTION OF THE INVENTION

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to, among other things, apparatus, systems and methods for navigation related data transfer between portable devices. One type of navigational system includes Global Positioning Systems (GPS). Such systems are known and have a variety of uses. In general, GPS is a satellite-based radio navigation system capable of determining continuous position, velocity, time, and in some instances direction information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometric triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

Figure 1:
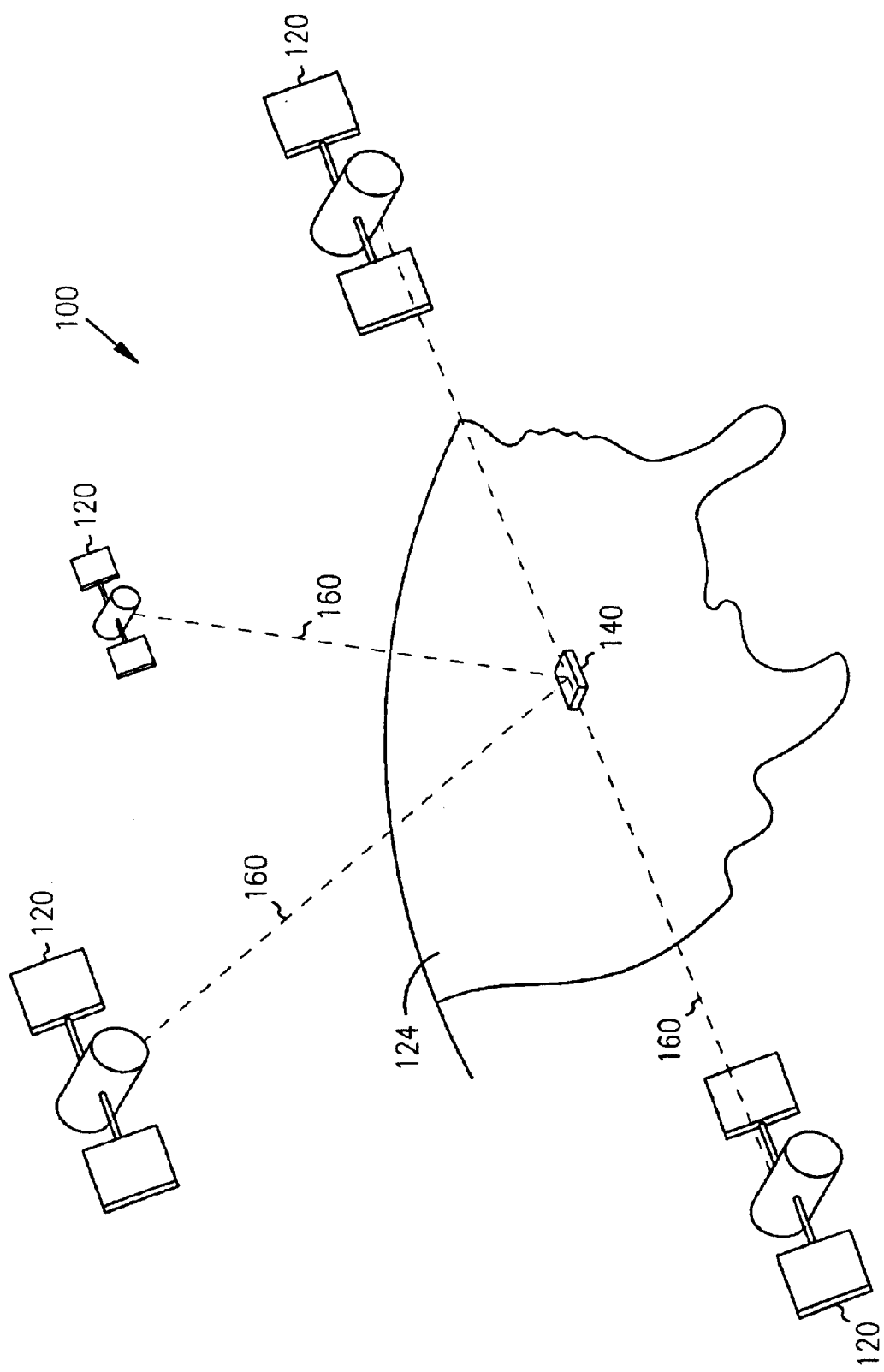
FIG. 1 is a representative view of a Global Positioning System (GPS)

FIG. 1 is representative of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

Figure 2A:
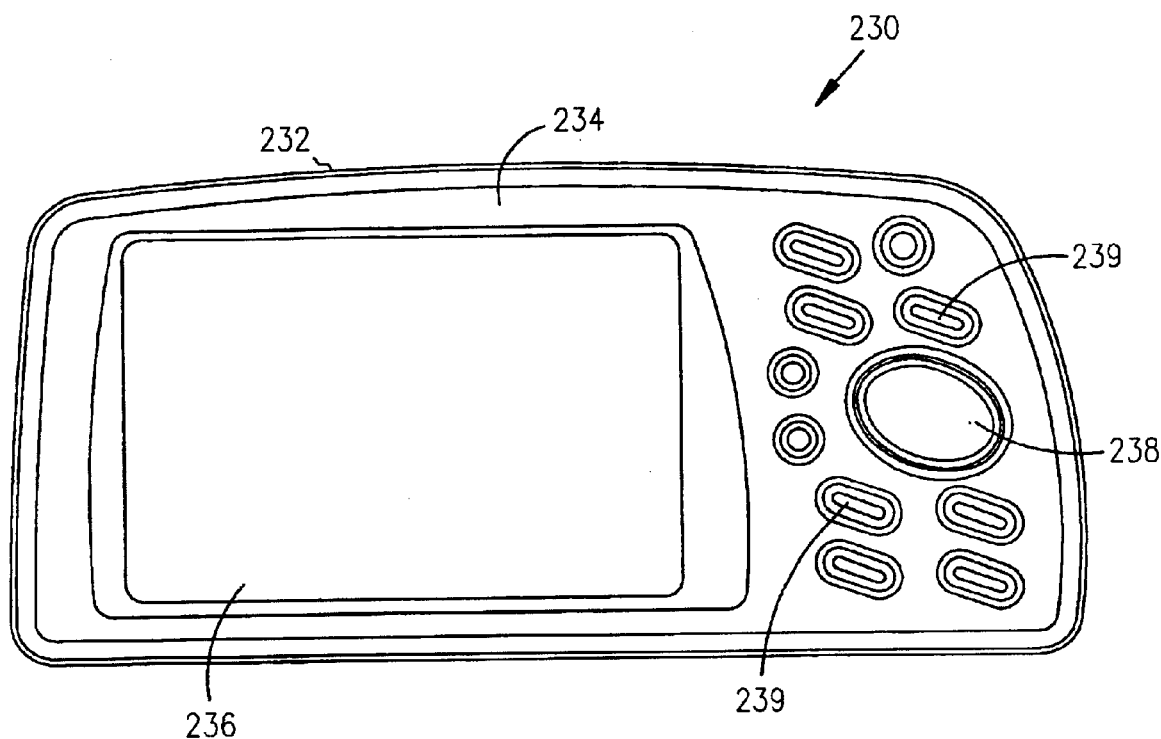
FIGS. 2A and 2B illustrate views for one embodiment of an electronic navigational device according to the teachings of the present invention.
Figure 2B:
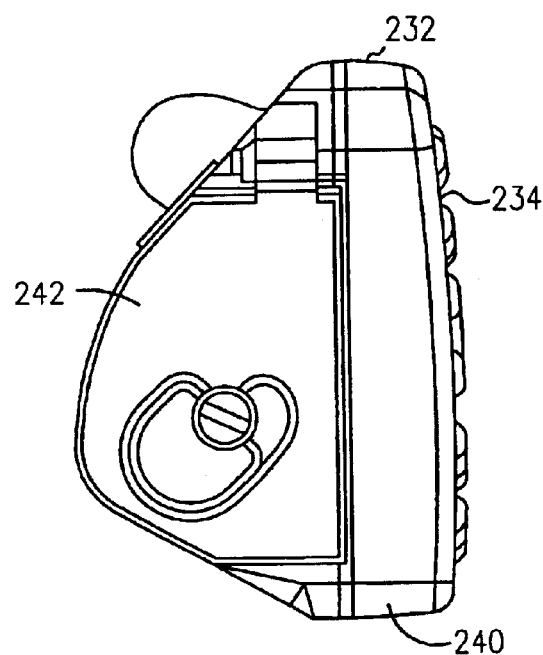

FIGS. 2A and 2B illustrate views for one embodiment of an electronic navigational device 230 according to the teachings of the present invention. As one of ordinary skill in the art will understand upon reading this disclosure, the device can be portable and can be utilized in any number of implementations such as automobile, personal marine craft, and avionic navigation. In the embodiment of FIG. 2A a front view of the navigational device 230 is provided showing the navigational device has a generally rectangular housing 232. The housing 232 is constructed of resilient material and has been rounded for aesthetic and ergonomic purposes. As shown in FIG. 2A, the control face 234 has access slots for an input key pad 238, other individual keys 239, and a display screen 236. In one embodiment, the display screen 236 is a LCD display which is capable of displaying both text and graphical information. The invention, however, is not so limited. Audio information can likewise be provided in one embodiment.

In FIG. 2B, a side view of the navigational device 230 is provided. FIG. 2B illustrates that the device's housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of one molded piece to form the device housing 232 and support input key pad 238, other individual keys 239, and display screen 236 in respective access slots shown in the control face 234 of FIG. 2A.

FIGS. 3A–3C illustrate views for another embodiment of an electronic navigational device 310 according to the teachings of the present invention. The navigational device 310 shown in FIGS. 3A–3C includes a personal digital assistant (PDA) with integrated GPS receiver and cellular transceiver according to the teachings of the present invention. The GPS integrated PDA operates with an operating system (OS) such as, for example, the well-known Palm or Pocket PC operating systems, or the lesser-used Linux OS. As shown in the top view of FIG. 3A, the GPS integrated PDA 310 includes an internal integrated GPS patch antenna 314 and a cellular transceiver 316 contained in a housing 318. The housing 318 is generally rectangular with a low profile and has a front face 320 extending from a top end 322 to a bottom end 324. Mounted on front face 320 is a display screen 326, which is touch sensitive and responsive to a stylus 330 (shown stored in the side view of FIG. 3B) or a finger touch. FIGS. 3A–3C illustrate the stylus 330 nested within housing 318 for storage and convenient access in a conventional manner. The embodiment shown in FIG. 3A illustrates a number of control buttons, or input keys 328 positioned toward the bottom end 324. The invention, however, is not so limited and one of ordinary skill in the art will appreciate that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and one of ordinary skill in the art will appreciate that a map data cartridge bay slot 332 and headphone jack 334 can be provided at the bottom end 324, separately at opposite ends, or at any other suitable location.

It should be understood that the structure of GPS integrated PDA 310 is shown as illustrative of one type of integrated PDA navigation device. Other physical structures, such as a cellular telephone and a vehicle-mounted unit are contemplated within the scope of this invention.

Thus, FIGS. 2A–2B and 3A–3C are provided as illustrative examples of hardware components for a navigational device according to the teachings of the present invention. However, the invention is not limited to the configuration shown in FIGS. 2A–2B and 3A–3C. One of ordinary skill in the art will appreciate other suitable designs for a hardware device which can accommodate the present invention.

Figure 4A:
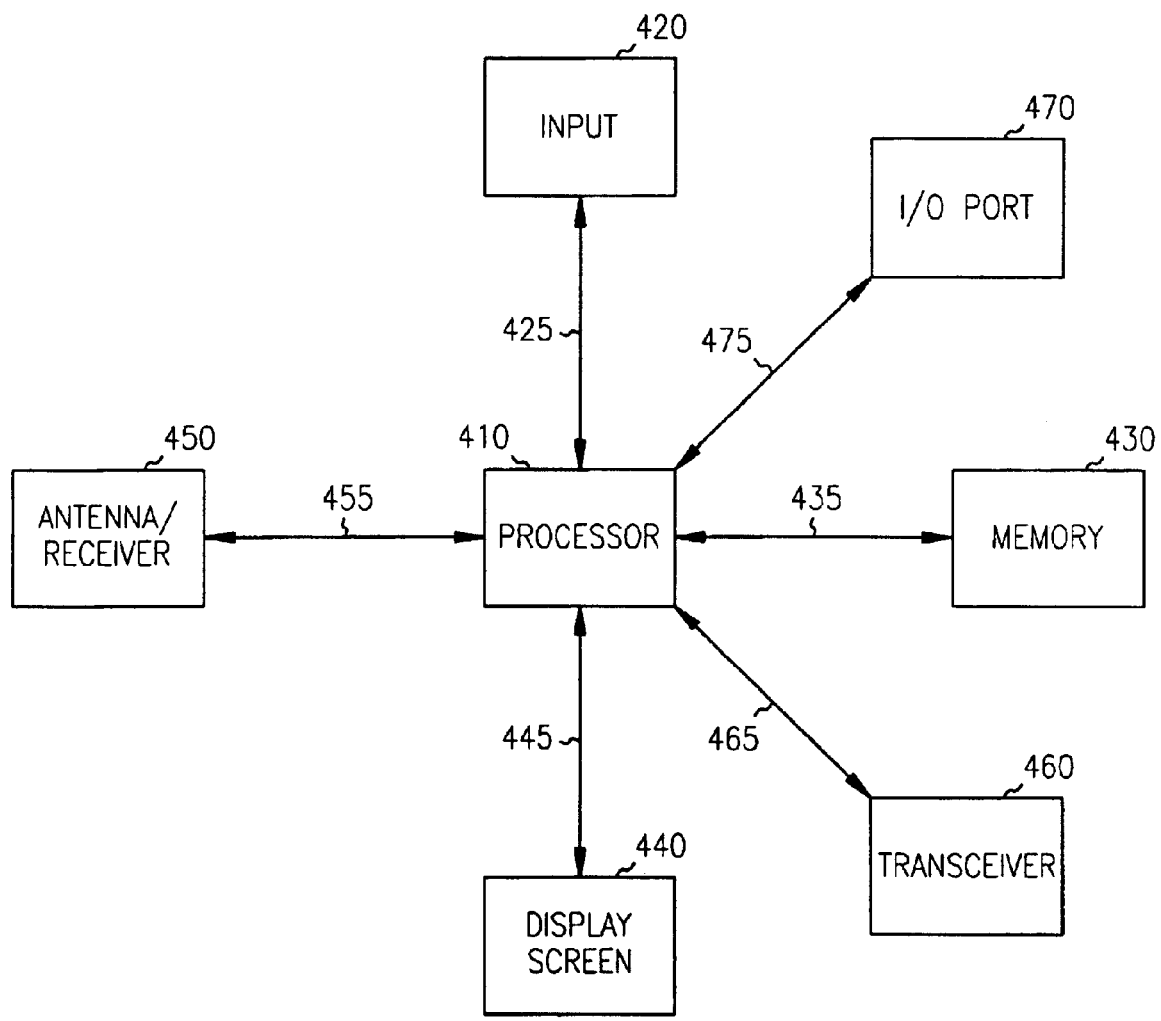
FIG. 4A is a block diagram of one embodiment for the electronic components within the hardware of FIGS. 2A–2B according to the teachings of the present invention.

FIG. 4A is a block diagram of one embodiment for the electronic components within the hardware of FIGS. 2A–2B, such as within housing 332 and utilized by the electronic navigational device. In the embodiment shown in FIG. 4A, the electronic components include a processor 410 which is connected to an input 420, such as keypad via line 425. It will be understood that input 420 may alternatively be a microphone for receiving voice commands. Processor 410 communicates with memory 430 via line 435. Processor 410 also communicates with display screen 440 via line 445. An antenna/receiver 450, such as a GPS antenna/receiver is connected to processor 410 via line 455. It will be understood that the antenna and receiver, designated by reference numeral 450, are combined schematically for illustration, but that the antenna and receiver may be separately located components, and that the antenna may be a GPS patch antenna or a helical antenna. The electronic components of shown in FIG. 4A include a transceiver 460 which is coupled to the processor 410 via line 465. The electronic components further include I/O ports 470 connected to processor 410 via line 475.

Figure 4B:
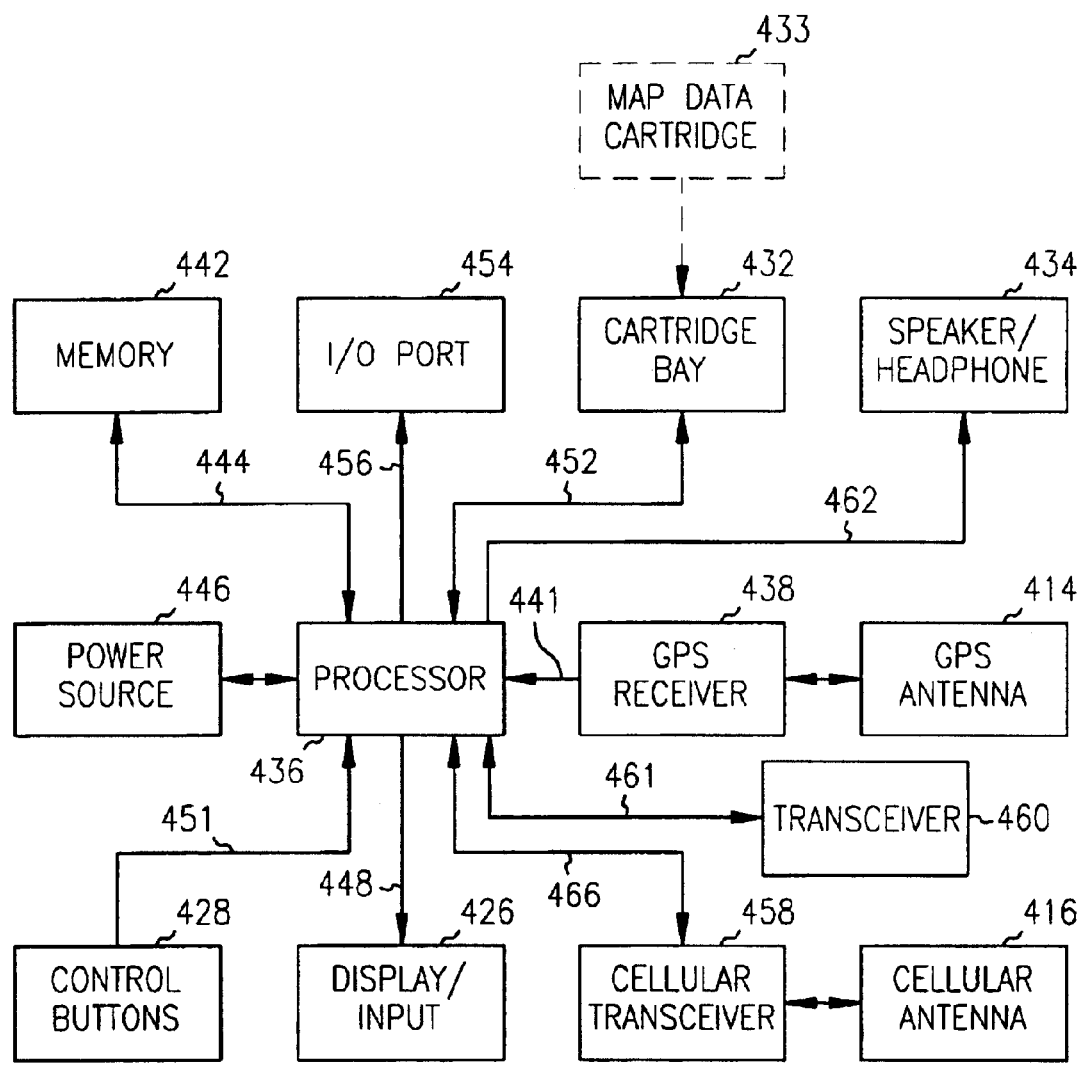
FIG. 4B is a block diagram of one embodiment for the electronic components within the hardware of FIGS. 3A–3C according to the teachings of the present invention.

FIG. 4B is a block diagram of one embodiment for the electronic components within the hardware of FIGS. 3A–3C and utilized by the GPS integrated PDA 310 according to the teachings of the present invention. The electronic components shown in FIG. 4B include a processor 436 which is connected to the GPS antenna 414 through GPS receiver 438 via line 441. The processor 436 interacts with an operating system (such as PalmOS; Pocket PC) that runs selected software depending on the intended use of the PDA 310. Processor 436 is coupled with memory 442 such as RAM via line 444, and power source 446 for powering the electronic components of PDA 310. The processor 436 communicates with touch sensitive display screen 426 via data line 448.

The electronic components further include two other input sources that are connected to the processor 436. Control buttons 428 are connected to processor 436 via line 451 and a map data cartridge 433 inserted into cartridge bay 432 is connected via line 452. A conventional serial I/O port 454 is connected to the processor 436 via line 456. Cellular antenna 416 is connected to cellular transceiver 458, which is connected to the processor 436 via line 466. Processor 436 is connected to the speaker/headphone jack 434 via line 462. The PDA 310 may also include an infrared port (not shown) coupled to the processor 436 that may be used to beam information from one PDA to another. The same will be explained in more detail below.

According to the teachings of the present invention, and as shown in the embodiments of FIGS. 4A and 4B, the electronic components of the present invention include a memory, shown as 442 in FIG. 4B, which is adapted to store and/or house a set of executable instructions, programs, and/or program modules. For ease of illustration, the memory will be discussed in reference to FIG. 4B where the memory 442 is coupled to the processor 436 via line 444. As one of ordinary skill in the art will appreciate, the memory 442 is adapted to communicate with the processor 436. In the invention, the memory 442 is further adapted to store or house navigation related data and is adapted to house or store software operable to perform routing algorithms. Examples of such routing algorithms include, but are not limited to, routing algorithms as described in commonly assigned applications entitled; "Systems and Methods for a Navigational Device with Improved Route Calculation Capabilities," application Ser. No. 10/028,057, "Systems and Methods for a Navigational Device with Forced Layer Switching Based on Memory Constraints," application Ser. No. 10/027,159, "Systems and Methods for a Navigational Device with Automated Next Turn Page," application Ser. No. 10/029,917, "Systems and Methods for a Navigational Device with Voice Guidance," application Ser. No. 10/029,732, and "Systems and Methods for a Navigational Device with Detour Routing Capabilities," application Ser. No. 10/028,343, each of which is incorporated herein in full by reference.

According to the teachings of the present invention, the navigation related data includes cartographic data. The cartographic data includes a number of locations and data indicative of thoroughfares of a plurality of types connecting certain ones of the locations. In one embodiment, the navigation related data includes a calculated route between at least two of the number of locations. Further, according to the teachings of the present invention, the software stored or housed within memory 442 includes software operable to perform one or more applications for navigation. As used herein, software operable to perform one or more applications for navigation includes, but is not limited to, software operable to find points of interest. In one embodiment, the navigation related data includes navigation data selected from the group of a number of waypoints, a planned route, and points of interest. In one embodiment, the points of interest include points of interest selected from the group of geographical points of interest, entertainment venues, dining venues, historical points of interest, and lodging venues. In one embodiment, the navigation related data includes navigation data selected from the group of automobile navigation data, marine craft navigation data, pedestrian navigation data, and hiking navigation data.

In one embodiment, the device is GPS enabled. In this embodiment, the software is operable to calculate an estimated time of arrival of the device to the a desired destination using an integrated GPS capability of the device.

According to the teachings of the present invention, and as shown in the embodiments of FIGS. 4A and 4B, the electronic components of the present invention include a transceiver shown as 460 which is coupled to the processor. For ease of illustration, the transceiver will be discussed in reference to FIG. 4B where the transceiver 460 is couple to the processor 436 via line 461. The description, however, applies analogously to the electronic components shown in FIG. 4A. As stated above, the memory is adapted to store or house software. According to the teachings of the present invention, software is provided which includes a set of executable instructions, programs, and or program modules adapted to control transceiver 460 such that the transceiver 460 can transmit and receive navigation data between a handheld electronic device and an other portable and/or handheld device. For example, in one embodiment, the software includes a set of executable instructions adapted to transmit and receive the navigation related data via a commercial communications network.

One example of a commercial communications network includes an analog cellular network using plain old telephone service (POTS). Another example of a commercial communications network to which the present invention is adapted includes a digital packet switched cellular network such as a personal communications service (PCS) network. As one of ordinary skill in the art will understand upon reading this disclosure, the transceiver 460 of the present invention is adapted to transmit and receive navigation related data via the Internet using Internet Protocol (IP). Thus, the present invention includes a handheld electronic device which is adapted to transmit and receive navigation related data over a wide area network (WAN) using any number or combination of hardwired and/or wireless communication channels. For instance, the transceiver of the present invention is adapted to transmit and receive navigation related data using a wireless application protocol (WAP). However, as one of ordinary skill in the art will understand upon reading and comprehending this disclosure, the invention is not limited to single one or particular combination of WAN communication channels or protocols. That is the transceiver can be instructed to transmit and receive navigation related data in a 3G GSM/CDMA network, and other networks of the like.

Similarly, according to the teachings of the present invention, the transceiver 460 is adapted to transmit and receive navigation related data over a local area network (LAN). In this embodiment, the transceiver 460 is adapted to operate in a short range network and wirelessly transmit and receive the navigation related data between a handheld electronic device and an other portable and/or handheld electronic device using either infra-red signaling and/or a Bluetooth signaling technology as the same are know and understood by one of ordinary skill in the art. The invention is not so limited. As one of ordinary skill in the art will understand upon reading this disclosure, the portable and/or handheld electronic devices described herein include multipurpose devices, e.g. PDAs, cell phones and other intelligent appliances/apparel of the like, which can wirelessly transmit navigation related data from one such device to another. That is, in one embodiment, according to the teachings of the present invention, the handheld electronic device includes devices selected from the group of cell phones, intelligent apparel, and PDAs. In one embodiment, the other portable and/or handheld electronic device similarly includes devices selected from the group of cell phones, intelligent apparel, and PDAs.

Thus, according to the teachings of the present invention, navigation related data can be transmitted and received with much greater efficacy. Using the software and transceiver 460 of the present invention, navigation related data can be transmitted over any communications network at any point in time. Thus, by way of example and not by way of limitation, navigation updates issued by such entities as NOAA can be distributed with much greater frequency. Typical navigation updates issued by NOAA include, but are not limited to, Notices to Mariners, or marine alerts indicating nautical chart changes due to buoy movement, channel pathway changes, sandbar information, marines hazards such as channel pathway obstructions, tide charts, and the like. Further, as described above, navigation related data such as routes, waypoints, points of interest, track logs, general cartographic maps, addresses and the like can be wirelessly transmitted and received between a handheld electronic device and an other portable and/or handheld electronic device using the software and transceiver 460.

As shown in FIGS. 4A and 4B, the device further includes a display in communication with the processor and the memory, e.g. display 426 in FIG. 4B. The display is adapted to display all or part of a "convergence" and/or a "solution." As used herein, the terms convergence and/or solution are intended to mean a complete path provided by the thoroughfares of a plurality of types connecting certain ones of the number of locations in the cartographic data. According to the teachings of the present invention, the device incorporates these and other functions as will be explained in more detail below in connection with FIGS. 6–7.

Figure 5A:
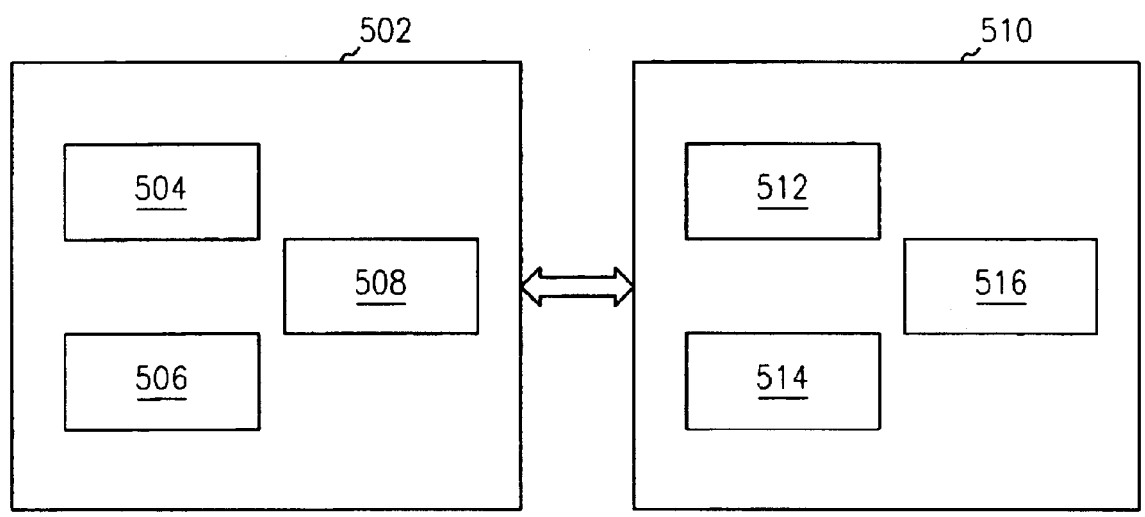
FIG. 5A is a block diagram of one embodiment for a navigation system according to the teachings of the present invention.

FIG. 5A is a block diagram of an embodiment of a navigation system which can be adapted to the teachings of the present invention. In the embodiment of FIG. 5, the invention includes a navigation system using a number of thin clients, 502 and 510. As shown in the embodiment of FIG. 5A, a first thin client 502 is provided. According to the teachings of the present invention, the first thin client 502 includes, but is not limited to a first thin client 502 selected from the group of a cell phone, a PDA, an intelligent appliance, an article of intelligent apparel, or any thin client of the like. As one of ordinary skill in the art will understand upon reading this disclosure, the first thin client 502 includes a first thin client having hardware and electronic components as described in detail above in connection with FIGS. 2A–4B. The first thin client 502 includes a processor 504, a memory 506, and a transceiver 508 adapted to communicate with one another. According to the teachings of the present invention, the memory 506 is adapted to store navigation related data. The navigation data includes navigation data as explained and described in detail above in connection with FIGS. 4A and 4B. Thus, the navigation related data includes cartographic data including a number of locations and data indicative of thoroughfares of a plurality of types connecting certain ones of the locations. And, the memory 506 is adapted to store software including software operable to perform routing algorithms, and other navigation related applications as the same have been described herein.

As shown in FIG. 5A, the navigation system of the present invention includes a second thin client 510. According to the teachings of the present invention, the second thin client 510 includes, but is not limited to a second thin client 510 selected from the group of a cell phone, a PDA, an intelligent appliance, an article of intelligent apparel, or any thin client of the like. As one of ordinary skill in the art will understand upon reading this disclosure, the second thin client 510 includes a second thin client having hardware and electronic components as described in detail above in connection with FIGS. 2A–4B. The second thin client 510 includes a processor 512, a memory 514, and a transceiver 516 adapted to communicate with one another. According to the teachings of the present invention, the memory 514 is adapted to store navigation related data. The navigation data includes navigation data as explained and described herein. And, the memory 506 is adapted to store software including software operable to perform routing algorithms, and other navigation related applications as the same have been described herein.

According to the teachings of the present invention, the transceivers, 508 and 516, in the first and the second thin clients, 502 and 510, are adapted to transmit and receive the navigation related data wirelessly between the first and the second thin clients, 502 and 510 as explained and describe in detail above in connection with FIGS. 4A and 4B. That is, the transceivers, 508 and 516, are adapted to transmit and receive the navigation related data wirelessly using a communication technology selected from the group of infra-red signaling, rf signaling, cellular based signaling (whether digital and/or analog), bluetooth signaling, and microwave signaling over either LANs or WANs.

As discussed above, in one embodiment the navigation related data includes navigation data selected from the group of automobile navigation data, marine craft navigation data, pedestrian navigation data, and hiking navigation data. In one embodiment, the navigation related data includes navigation data selected from the group of a number of waypoints, a planned route, and points of interest.

According to the teachings of the present invention, at least one of the first and the second thin clients, 502 and 510, includes a GPS enabled handheld device. As stated above, the memory, 506 and/or 514, is adapted to house or store software operable to perform routing algorithms. Thus, according to the teachings of the present invention, the at least one of the first and the second GPS enabled handheld devices, 502 and 510, (and/or both 502 and 510) are adapted to use the above described software for performing routing algorithms and to track the first and/or the second thin client, 502 and 510.

As one of ordinary skill in the art will appreciate upon reading this disclosure and as explained in more detail below, the first and the second thin client, 502 and 510, can transmit and/or receive a calculated route between one another. Moreover, as one of ordinary skill in the art will appreciated and as will be described in more detail below, one of the first and the second thin clients, 502 and 510, can track the location of the other thin client while the other thin client is in motion, along a calculated route or otherwise.

In one embodiment, by way of illustration and not by way of limitation, the second thin client includes a handheld GPS enabled device. According to the teachings of the present invention, the second thin client 510 is adapted to receive navigation related data, using transceiver 516, from the first thin client 502 and has software stored or housed in memory 514 which is operable on the received navigation related data to perform a route calculation between two or more locations, to find a point of interest and calculate a route to the same, and to track a location of the second thin client 510 using its GPS. In another embodiment, the second thin client 510 is adapted to receive a route, using transceiver 516, from the first thin client 502, the route having been calculated in the first thin client 502 using software stored or housed in the memory 506 of the first thin client 502. The second thin client 510 is further operable on the received route to track a location of the second thin client 510 using its GPS, along the route or otherwise, e.g. off route. Similarly, the second thin client 510 is adapted to operate on navigation related data received from the first thin client 502 to calculate a new route to a new desired destination, and transmit a location of the second thin client 510 to the first thin client 502 using transceiver 516.

As one of ordinary skill in the art will understand upon reading this disclosure, the above described operations, according to the teachings of the present invention, can equally be performed in the reverse sequence order or direction of communication and operation between the first and the second thin clients, 502 and 510. The invention is not so limited.

Figure 5B:
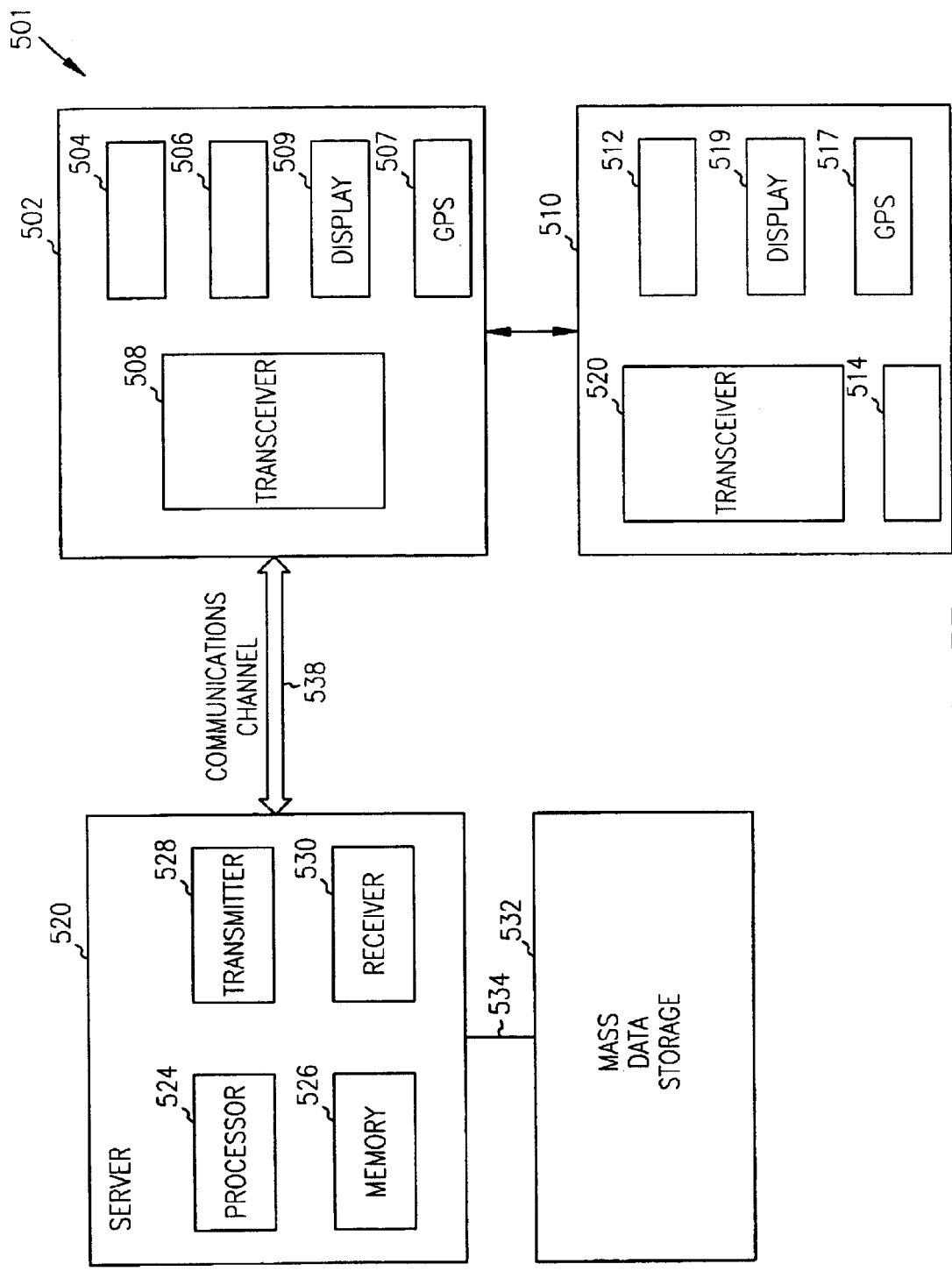
FIG. 5B is a block diagram of another embodiment for a navigation system according to the teachings of the present invention.

FIG. 5B is a block diagram of an embodiment of a navigation system 501 which can be adapted to the teachings of the present invention. In the embodiment of FIG. 5B, the invention includes a navigation system 501 having a number of thin clients, 502 and 510 as the same have been described and explained in detail above in connection with FIG. 5A. In the embodiment of FIG. 5B, at least one of the first and the second thin clients, 502 and 510 include a GPS component, 507 and 517 respectively, as well as a display, 509 and 519 respectively.

In the embodiment of FIG. 5B, navigation system 501 includes a larger client 520, such as a desktop computer, laptop computer, and/or server 520. According to one embodiment, the larger client, e.g. server 520, includes a processor 524 operably coupled to memory 526, and further includes a transmitter 528 and a receiver 530 to send and receive data, communication signals, and/or other propagated signals. The transmitter 528 and receiver 530 are selected or designed according to the communication requirements and the communication technology used in the communication design for the navigation system 501. As one of ordinary skill in the art will understand upon reading this disclosure, the functions of the transmitter 528 and the receiver 530 may be combined into a single transceiver.

According to the teachings of the present invention as shown in the embodiment of FIG. 5B, the server 520 includes a remote server 520. According to other embodiments of the navigation system 501, the server 520 includes a network server located on a local area network (LAN), wide area network (WAN), a virtual private network (VPN) and server farms. As described herein the server 520 is adapted to communicate with one or more thin clients, e.g. first and second thin clients 502 and 510. According to the teachings of the present invention, the remote server memory 526 is adapted to store navigation related data. As described above, the navigation related data includes, among other things, cartographic data including a number of locations and data indicative of thoroughfares of a plurality of types connecting certain ones of the locations. Further, the remote server memory 526 is adapted to store software including software operable to perform routing algorithms as the same have been described above. In one embodiment of the present invention, the remote server processor 524 operates on a route calculation algorithm, stored or housed in memory 526 to find a convergence between any two of the number of locations.

In one embodiment according to the teachings of the present invention, and as shown in FIG. 5B, the system 501 further includes a mass data storage 532 which is adapted to store navigation data. In this embodiment, the remote server 520 and at least one of the first and the second thin clients 502 and 510 (shown here as first thin client 502) are adapted to communicate with, e.g. to transmit and receive, navigation data back and forth between one another via a communication channel 538. In one embodiment according to the teachings of the present invention, the communication channel 538 includes a wireless channel. As one of ordinary skill in the art will understand upon reading this disclosure, the communication channel 538 is not limited to a particular communication technology. Additionally, the communication channel 538 is not limited to a single communication technology; that is, the channel 538 may include several communication links that use a variety of technology. For example, according to various embodiments, the communication channel 538 is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, the Internet, radio-frequency (RF) waveguides, the atmosphere, and empty space. Furthermore, according to various embodiments, the communication channel 538 includes intermediate devices such as routers, repeaters, buffers, modems, transmitters, and receivers, for example.

In one embodiment, for example, the communication channel 538 includes telephone and computer networks. Furthermore, in various embodiments, the communication channel 538 is capable of accommodating wireless communication such as radio frequency, microwave frequency and infrared communication, and the like. Additionally, according to various embodiments, the communication channel 538 accommodates satellite communication.

In the invention, the communication signals transmitted through the communication channel 538 include such signals as maybe required or desired for a given communication technology. For example, the signals may be adapted to be used in cellular communication technology, such as time division multiple access (TDMA), frequency division multiple access (FDMA), code division multiple access (CDMA), global system for mobile communications (GSM), third generation (3G) GSM/CDMA, and the like. Both digital and analog signals may be transmitted through the communication channel 538. According to various embodiments, these signals are modulated, encrypted and/or compressed signals as may be desirable for the communication technology.

According to the teachings of the present invention, the server processor 524 is adapted to respond to a request from the one or more thin clients, e.g. first and second thin clients 502 and 510, by performing calculations on the cartographic data and transmitting results, using transmitter 528, to at least one of the first and the second thin clients 502 and 510. According to the teachings of the present invention, the server 520 is adapted to transmit, and the at least one of the first and the second thin clients, 502 and 510 is adapted to receive, the navigation data in a manner as explained and described in detail above in connection with FIGS. 4A and 4B. In one embodiment of the present invention, the remote server processor 524 operates on a route calculation algorithm, stored or housed in memory 526 to find a convergence between any two of the number of locations. Thus, according to the teachings of the present invention, server memory 526 is adapted to house or store software which provides instructions for the processor 524 and allows the server 520 to provide services to one or more thin clients, e.g. thin clients 502 and 510. Although only a first and a second thin client, 502 and 510, are illustrated in FIG. 5B, one of ordinary skill in the art will understand upon reading this disclosure that any number of thin clients can communicate with the server 520, according to the teachings of the present invention.

Likewise, the at least one of the first and the second thin clients, 502 and 510, is adapted to transmit navigation related data to the server 520 in a manner as explained and described in detail above in connection with FIGS. 4A and 4B. Thus, at least one of the first and the second thin clients, 502 and 510, is adapted to transmit track logs and the like to server 520 for storage and/or processing. Reciprocally, the at least one of the first and the second thin clients, 502 and 510, is adapted to communicate with and retrieve navigation data from the remote server 520 using cellular communication technology, e.g. a PCS digital cellular packet switched service. Further, the first and the second thin clients, 502 and 510, are adapted to transmit and receive navigation related data between one another using transceivers, 508 and 516 respectively, in a manner as explained and described in detail above in connection with FIGS. 4A–5A.

As shown in the embodiment of FIG. 5B, the navigation system 501 further includes a mass data storage 532 coupled to the server 520 via communication link 534. The mass data storage 532 is adapted to store or house navigation data. One of ordinary skill in the art will understand, upon reading and comprehending this disclosure, that the mass data storage 532 can be a separate device from the server 532 and/or can be incorporated into the server 520.

According to one embodiment of the present invention, one service provided by the server 520 involves processing requests from one or more thin clients, e.g. thin clients 502 and 510, and transmitting navigation data from the mass data storage 532 to the one or more thin clients, e.g. thin clients 502 and 510. According to one embodiment, another service provided by the server 520 includes processing the navigation data using various algorithms for a desired navigation application, e.g. performing a route calculation or finding points of interest, and sending the results of the processing to one or more thin clients, e.g. thin clients 502 and 510.

In this embodiment of the present invention, the mass data storage 532 includes sufficient memory for a multitude of desired navigation applications. Examples of mass data storage 532 include magnetic data storage media such as hard drives, optical data storage media such as CD ROMs, charge storing data storage media such as Flash memory, and include molecular memory, such as now known or hereinafter developed.

As one of ordinary skill in the art will understand upon reading this disclosure, the systems in FIGS. 5A and 5B can further operate on signals, e.g. GPS signals, originally received by the one or more thin clients, e.g. thin clients 502 and 510. As one of ordinary skill in the art will understand upon reading and comprehending this disclosure, a user of the one or more thin clients, e.g. thin clients 502 and 510 can be proximate to or accompanying the one or more thin clients, e.g. thin clients 502 and 510. The invention however, is not so limited.

As one of ordinary skill in the art will appreciate upon reading this disclosure, the one or more thin clients, e.g. thin clients 502 and 510, are adapted to display the navigation related data on their respective displays, e.g. 509 and 519.

Thus, in one embodiment of the present invention, the one or more thin clients, e.g. thin clients 502 and 510, are adapted to display a route calculated using the software housed or stored in the memory of the thin client. Additionally, the one or more thin clients, e.g. thin clients 502 and 510 are adapted to display a route calculated on an other thin client using software stored or housed in that other thin client and then transmitted to and received by the thin client. For example, a first thin client 502 is adapted to calculate a route, find a point of interest, retrieve a map, or perform any other related navigation application and then transmit the results to a second thin client 510 using its transceiver, as the same has been described in detail above, where the navigation related results will be displayed.

Likewise, the server 520 can calculate a route, find a point of interest, retrieve a map, or perform any other related navigation application upon receiving a request from the one or more thin clients, e.g. thin clients 502 and 510, even retrieving navigation relate data from the mass storage device 532, and then transmit the results to the one or more thin clients, e.g. thin clients 502 and 510, where the navigation related results will be displayed.

According to the teachings of the present invention, the one or more thin clients, e.g. thin clients 502 and 510, which are GPS enabled having GPS components 507 and 517, are adapted to display, on a respective display such as 509 and 519, a location of the one or more thin clients, e.g. thin clients 502 and 510, on a cartographic map. Further, according to the teachings of the present invention, the one or more thin clients, e.g. thin clients 502 and 510, are adapted to transmit the location of the one or more thin clients, e.g. thin clients 502 and 510, in the manner described in detail above, to any one or more thin clients, e.g. thin clients 502 and 510, and any number of remote servers to be displayed thereon on a cartographic map. In the invention, the same is independent of where the navigation related data is operated upon and is independent of which thin client or portable electronic device is GPS enabled and employing its GPS component, e.g. 507 and 517, to track its location.

Thus, by way of example and not by way of limitation, in one embodiment of the present invention a route is calculated on the second thin client 510, operating on a set of navigation data received by the second thin client 510, using transceiver 516, from the first thin client 502. The second thin client 510, using its GPS component, tracks a location of the second thin client 510 and can display its location on a cartographic map on its display 519. And, in the invention, this location can further be displayed on a cartographic map on the display 509 of the first thin client 502 and/or on a cartographic map on a display 531 connected to server 520.

One of ordinary skill in the art will understand upon reading this disclosure, the many combinations in which a handheld electronic device can share tasks, resources, and information in a system, according to the teachings of the present invention, between one or more thin clients, e.g. 502 and 510, and a remote server 520. The invention is not so limited to the examples given above. The features and functionality explained and described in detail above in connection with the device of FIGS. 4A and 4B are likewise available in the systems of FIGS. 5A and 5B.

Figure 6:
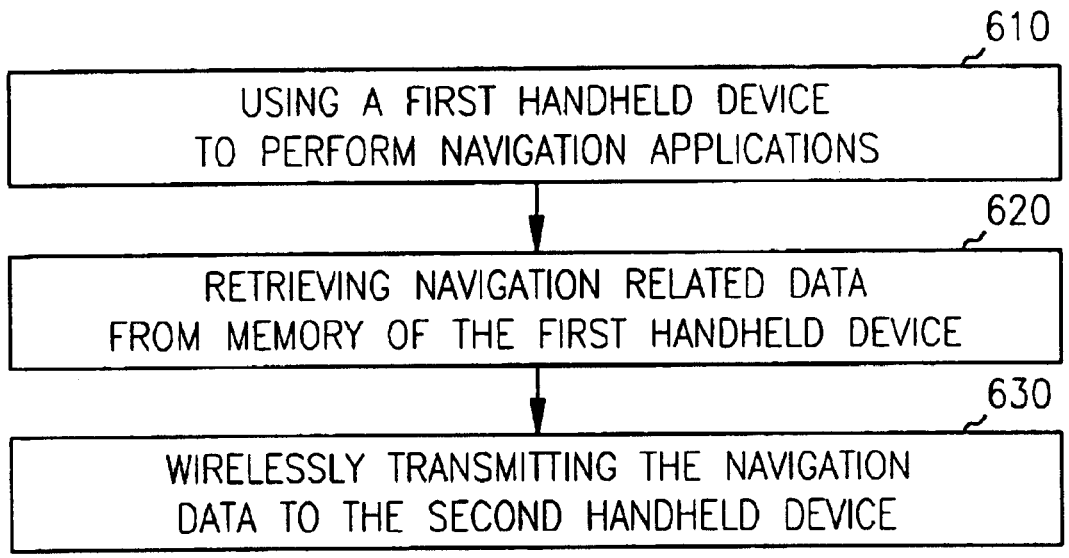
FIG. 6 is a flow diagram of one embodiment of a navigation aid method according to the teachings of the present invention.

FIG. 6 is a flow diagram of one embodiment of a navigation aid method according to the teachings of the present invention. The navigation aid method includes a method for navigation data transfer between portable devices as described and explained in detail above in connection with FIGS. 4A–5B. And, as described above, a processor and transceiver are used for processing signals which include input data from input devices, e.g. keypads, other input keys, or other inputs, GPS signals from GPS components, and data received from I/O ports in order to perform the methods described herein. As shown in FIG. 6, the method includes using a first handheld electronic device to perform navigation applications in block 610. According to the teachings of the present invention and as described above, the first handheld electronic device includes a processor, a memory, and a transceiver adapted to communicate with one another. In the invention, the memory is adapted to store navigation related data, the navigation related data including cartographic data including a number of locations and data indicative of thoroughfares of a plurality of types connecting certain ones of the locations. Further, the memory is adapted to store software including software operable to perform routing algorithms. In block 620, the method includes retrieving navigation related data from the memory of the first handheld electronic device. As used herein, the navigation related data includes, but is not limited to, the navigation applications, and/or a number of waypoints, a planned route, track logs, and points of interest.

In block 630, the method further includes wirelessly transmitting the navigation data to a second handheld electronic device. Thus, in the present invention, wirelessly transmitting the navigation data to a second handheld electronic device includes wirelessly transmitting navigation related data selected from the group of a number of waypoints, a planned route, track logs, and points of interest. According to the teachings of the present invention, the second handheld electronic device includes a device having a processor, a memory, and a transceiver adapted to communicate with one another and the first handheld electronic device.

In one embodiment according to the teachings of the present invention, wirelessly transmitting the navigation data to a second handheld electronic device includes wireless transmitting the navigation data to a GPS enabled handheld device. In one embodiment, the memory of the GPS enabled handheld device includes software adapted to perform routing algorithms. Thus, in this embodiment the method further includes operating on the navigation data to perform a route calculation.

In one embodiment, the method includes performing a route calculation on the first handheld device. In this embodiment, wirelessly transmitting the navigation data to a second handheld electronic device includes transmitting the calculated route to the second handheld electronic device.

Figure 7:
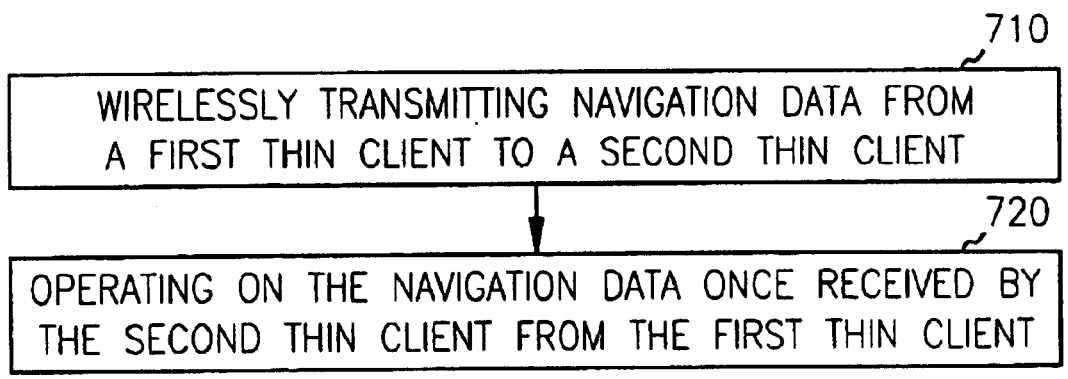
FIG. 7 is a flow diagram of another embodiment of a navigation aid method according to the teachings of the present invention.

FIG. 7 is a flow diagram of another embodiment of a navigation aid method according to the teachings of the present invention. The navigation aid method includes a method for navigation data transfer between thin clients as described and explained in detail above in connection with FIGS. 4A–5B. And, as described above, a processor and transceiver are used for transmitting, receiving and processing signals which include input data from input devices, e.g. keypads, other input keys, or other inputs, GPS signals from GPS components, and data received from I/O ports in order to perform the methods described herein. As shown in FIG. 7, the method includes wirelessly transmitting navigation data from a first thin client to a second thin client in block 710. In the embodiment of FIG. 7, the method further includes operating on the navigation data once received by the second thin client from the first thin client in block 720. In one embodiment, operating on the navigation data in block 720 includes displaying the navigation related data on the second thin client. In one embodiment, operating on the navigation data in block 720 includes storing the navigation related data. In the invention, storing the navigation related data includes, but is not limited to, storing navigation related data selected from the group of automobile navigation data, marine craft navigation data, pedestrian navigation data, and hiking navigation data. In one embodiment, storing the navigation related data includes, but is not limited to, storing navigation related data selected from the group of a number of waypoints, a planned route, and points of interest. In one such embodiment, storing the navigation related data includes storing points of interest selected from the group of geographical points of interest, entertainment venues, dining venues, and lodging venues.

According to the teachings of the present invention, wirelessly transmitting navigation data from a first thin client to a second thin client includes wirelessly transmitting navigation data from a first thin client selected from the group of a cell phone, a PDA, an intelligent appliance, an article of intelligent apparel or other thin clients of the like. In an alternative embodiment, the first thin client is replaced by a larger client such as a desktop computer, a laptop computer, and/or a server. The invention is not so limited. In one embodiment, wirelessly transmitting navigation data from a first thin client to a second thin client includes wirelessly transmitting navigation data from a GPS enabled handheld device.

According to the teachings of the present invention, wirelessly transmitting navigation data from a first thin client to a second thin client includes using a communication technology selected from the group of infra-red signaling, cellular technology, bluetooth technology, and microwave technology.

In one embodiment, the second thin client includes a handheld GPS enabled device. In this embodiment, operating on the navigation data includes using the GPS enabled second thin client to perform a route calculation and to track a location of the second thin client. In one embodiment, the method further includes displaying a route, calculated by the second thin client operating on the navigation data, to the first thin client. In one embodiment, the method further includes tracking the location of the second thin client on the first thin client.

In some embodiments, the methods provided above are implemented as a computer data signal embodied in a carrier wave or propagated signal, that represents a sequence of instructions which, when executed by a processor such as processor 410 in FIG. 4A, processor 436 in FIG. 4B, or processor 504 in FIG. 5, cause the processor to perform the respective method. In other embodiments, methods provided above are implemented as a set of instructions contained on a computer-accessible medium, such as memory 430 in FIG. 4A, memory 442 in FIG. 4B or mass storage device 512 in FIG. 5, capable of directing a processor, such as processor 410 in FIG. 4A, processor 436 in FIG. 4B or processor 504 in FIG. 5, to perform the respective method. In varying embodiments, the medium is a magnetic medium, an electronic medium, or an optical medium.

As one of ordinary skill in the art will understand upon reading this disclosure, the electronic components of device shown in FIGS. 4A and 4B, and components of the system 500 shown in FIG. 5 can be embodied as computer hardware circuitry or as a computer-readable program, or a combination of both. In another embodiment, system 500 is implemented in an application service provider (ASP) system.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). However, as will be appreciated by one of ordinary skill in the art upon reading this disclosure, the teachings of the present invention are not limited to a particular programming language or environment.

CONCLUSION

The above systems, devices and methods have been described, by way of example and not by way of limitation, with respect to navigation data transfer between portable devices. The above systems, apparatus and methods improve efficiency, speed and ease of user interaction with a navigation device. That is, the systems, devices and methods provide for a handheld electronic device which can perform navigation applications and can wirelessly transfer the resulting navigation data to another handheld electronic device. In some embodiments, the navigation data transfer is between two thin clients, either one of which can operate on the navigation data. In some embodiments, the results of operating on the navigation data is wirelessly shared with the other thin client. Thus, apparatus, systems and methods are provided for handheld electronic devices which possess navigation capabilities and which can more efficiently share navigation data with other large or thin clients using a communication technology selected from the group of infrared signaling, rf signaling, cellular based signaling (whether digital and/or analog), bluetooth signaling, and microwave signaling over either LANs or WANs.

The portable and/or handheld electronic devices described herein include multipurpose devices, e.g. PDAs, cell phones and other intelligent appliances/apparel of the like, which can wirelessly transmit navigation related data from one such device to another. That is, in one embodiment, according to the teachings of the present invention, the handheld electronic device includes devices selected from the group of cell phones, intelligent apparel, and PDAs. In one embodiment, the other portable and/or handheld electronic device similarly includes devices selected from the group of cell phones, intelligent apparel, and PDAs.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A portable electronic device, comprising:
   a processor,
   a memory to communicate with the processor, the memory to store navigation related data, the navigation related data including planned routes along thoroughfares calculated on the portable electronic device, and wherein the memory stores software including software operable to perform routing algorithms; and
   a transceiver, wherein the transceiver is to transmit the navigation related data wirelessly using local area wireless communications to other portable electronic devices.

2. The portable electronic device of claim 1, wherein the transceiver is to transmit the navigation related data wirelessly using a communication technology selected from the group of infra-red signaling and bluetooth technology.

3. The portable electronic device of claim 1, wherein the software includes software operable to perform one or more applications for navigation including finding points of interest and calculating an estimated time of arrival.

4. The portable electronic device of claim 1, wherein the device is GPS enabled.

5. The portable electronic device of claim 1, wherein the navigation related data includes navigation data selected from the group of automobile navigation data, marine craft navigation data, pedestrian navigation data, and hiking navigation data.

6. The portable electronic device of claim 1, wherein the navigation related data includes navigation data selected from the group of a number of waypoints and points of interest.

7. The portable electronic device of claim 6, wherein the points of interest include points of interest selected from the group of geographical points of interest, entertainment venues, dining venues, and lodging venues.

8. The portable electronic device of claim 1, wherein the device includes devices selected from the group of cell phones and PDAs.

9. The portable electronic device of claim 1, wherein the other portable electronic devices include devices selected from the group of cell phones and PDAs.

10. A navigation system using a number of thin clients, comprising:
    a first thin client having a processor, a memory, and a transceiver to communicate with one another, the memory to store navigation related data, the navigation related data including cartographic data including planned routes along thoroughfares calculated on the thin clients, and wherein the memory is to store software including software operable to perform routing algorithms,
    a second thin client having a processor, a memory, and a transceiver to communicate with one another, the memory adapted to store navigation related data, the navigation related data including planned routes along thoroughfares calculated on the thin clients, and wherein the memory is to store software including software operable to perform routing algorithms; and
    wherein the transceivers in the first and the second thin clients are to transmit the navigation related data wirelessly using local area wireless communications between the first and the second thin clients.

11. The system of claim 10, wherein the transceivers are to transmit the navigation related data wirelessly using a communication technology selected from the group of infra-red signaling and bluetooth technology.

12. The system of claim 10, wherein the software includes software operable to perform one or more applications for navigation including finding points of interest and calculating an estimated time of arrival.

13. The system of claim 10, wherein the navigation related data includes navigation data selected from the group of automobile navigation data, marine craft navigation data, pedestrian navigation data, and hiking navigation data.

14. The system of claim 10, wherein the navigation related data includes navigation data selected from the group of a number of waypoints and points of interest.

15. The system of claim 10, wherein the system further includes:
    a remote server having a processor, a memory, and a transceiver to communicate with one another and at least one of the first and the second thin clients;
    wherein the remote server memory is to store navigation related data, the navigation related data including planned routes along thoroughfares calculated on the thin clients;
    wherein the remote server memory is to store software including software operable to perform routing algorithms; and
    wherein the remote server processor operates on a route calculation algorithm to find a convergence between any two of the number of locations.

16. The system of claim 15, wherein the system further includes:
    a mass data storage to store navigation data;
    wherein the remote server and at least one of the first and the second thin clients are to communicate with and transmit navigation data back and forth between one another via a communication channel; and
    wherein at least one of the first and the second thin clients include a display to display the navigation related data.

17. The system of claim 16, wherein the communication channel includes a wireless channel.

18. The system of claim 15, wherein the remote server processor is to respond to a request from at least one of the first and the second thin clients by performing calculations on the cartographic data and transmitting results to the at least one of the first and the second thin clients.

19. The system of claim 18, wherein the at least one of the first and the second thin clients is to communicate with and retrieve navigation data from the remote server using cellular communication technology.

20. The system of claim 10, wherein at least one of the first and the second thin client includes a GPS enabled portable device.

21. The system of claim 10, wherein the first and the second thin clients are selected from the group of a cell phone, a PDA, an intelligent appliance, and an article of intelligent apparel.

22. A method for navigation data transfer between portable devices, comprising:
    using a first portable electronic device having a processor, a memory, and a transceiver adapted to communicate with one another, the memory to store navigation related data, the navigation related data including planned routes along thoroughfares calculated on portable electronic devices, and wherein the memory stores software including software operable to perform routing algorithms;

retrieving navigation related data from the memory of the first portable electronic device; and wirelessly transmitting the navigation related data using local area wireless communications to a second portable electronic device, the second portable electronic device having a processor, a memory, and a transceiver to communicate with one another and directly to the first portable electronic device.

23. The method of claim 22, where wirelessly transmitting the navigation data to a second portable electronic device includes wireless transmitting the navigation data to a GPS enabled portable device.

24. The method of claim 23, wherein the memory of the GPS enabled portable device includes software adapted to perform routing algorithms, and wherein the method includes operating on the navigation data to perform a route calculation.

25. The method of claim 22, wherein the method includes performing a route calculation on the first portable device, and wherein wirelessly transmitting the navigation data to a second portable electronic device includes transmitting the route to the second portable electronic device.

26. The method of claim 22, wherein wirelessly transmitting the navigation data to a second portable electronic device includes wirelessly transmitting navigation related data selected from the group of a number of waypoints and point of interest.

27. A method for navigation data transfer between thin clients, comprising:

wirelessly transmitting navigation related data including planned routes along thoroughfares calculated on the thin clients from a first thin client using local area wireless communications to a second thin client; and operating on the navigation related data once received by the second thin client from the first thin client.

28. The method of claim 27, wherein wirelessly transmitting navigation related data from a first thin client to a second thin client includes wirelessly transmitting navigation data from a first thin client selected from the group of a cell phone, and a PDA.

29. The method of claim 27, wherein wirelessly transmitting navigation data from a first thin client to a second thin client includes wirelessly transmitting navigation data from a GPS enabled portable device.

30. The method of claim 27, wherein wirelessly transmitting navigation data from a first thin client to a second thin client includes using a communication technology selected from the group of infra-red signaling and bluetooth technology.

31. The method of claim 27, wherein operating on the navigation data includes displaying the navigation related data on the second thin client.

32. The method of claim 27, wherein operating on the navigation data includes storing the navigation related data.

33. The method of claim 32, wherein storing the navigation related data includes storing navigation related data selected from the group of automobile navigation data, marine craft navigation data, pedestrian navigation data, and hiking navigation data.

34. The method of claim 32, wherein storing the navigation related data includes storing navigation related data selected from the group of a number of waypoints and points of interest.

35. The method of claim 32, wherein storing the navigation related data includes storing points of interest selected from the group of geographical points of interest, entertainment venues, dining venues, and lodging venues.

36. The method of claim 27, wherein the second thin client includes a portable GPS enabled device, and wherein operating on the navigation data includes using the GPS enabled second thin client to perform a route calculation along thoroughfares and track a location of the second thin client.

37. The method of claim 36, wherein the method further includes displaying a route calculated by the second thin client, operating on the navigation data, on the first thin client, and includes tracking the location of the second thin client on the first thin client.

38. A portable electronic device comprising:

a processor operable for calculating planned routes along thoroughfares;

memory accessible by the processor for storing software used for calculating the planned routes and for storing navigation data, the navigation data including data representative of the planned routes; and a transceiver coupled with the processor and operable to transmit at least portions of the data representative of the planned routes to other portable electronic devices using local area wireless communications.

39. The portable electronic device of claim 38, wherein the transceiver is operable to transmit the portions of the data using a communication technology selected from the group consisting of infra-red signaling and bluetooth communications.

40. A navigation system comprising:

a first thin client device including— a processor operable for calculating planned routes along thoroughfares, memory accessible by the processor for storing navigation related data, the navigation related data including data representative of the planned routes, a transceiver coupled with the processor and operable to transmit at least portions of the data representative of the planned routes using local area wireless communications; and a second thin client device including— a processor, a memory accessible by the processor for storing navigation related data, the navigation related data including the data representative of the planned routes, a transceiver coupled with the processor and operable to receive the portions of the data representative of the planned routes transmitted by the first thin client.

41. The navigation system of claim 40, wherein the transceiver of the first thin client is operable to transmit the portions of the data using a communication technology selected from the group consisting of infra-red signaling and bluetooth communications.

42. A navigation device comprising:

a GPS receiver for receiving signals from a plurality of satellites;

a processor coupled with the GPS receiver for calculating a location of the device as a function of the received signals;

memory accessible by the processor for storing navigation data used by the processor, the navigation data including data representative of a destination address;

a receiver coupled with the processor for receiving the data representative of a destination address from a portable electronic device via local area wireless communications; and a portable handheld housing for housing the GPS receiver, the processor, the memory, and the receiver.

43. The navigation device as set forth in claim 42, wherein the portable electronic device comprises a personal digital assistant.

44. The navigation device as set forth in claim 42, wherein the local area wireless communications is selected from the group consisting of infra-red signaling and bluetooth communications.

45. A portable handheld navigation device comprising:

a GPS receiver for receiving signals from a plurality of satellites;

a processor coupled with the GPS receiver for calculating a location of the device as a function of the received signals;

memory accessible by the processor for storing navigation data used by the processor, the navigation data including data representative of a destination address;

a receiver coupled with the processor for receiving the data representative of a destination address from a personal digital assistant (PDA) via a communication method selected from the group consisting of infra-red signaling and a bluetooth communications; and a portable handheld housing for housing the GPS receiver, the processor, the memory, and the receiver.

46. A navigation system comprising:

a GPS device including—
  a GPS receiver for receiving signals from a plurality of GPS satellites;
  a processor coupled with the GPS receiver for calculating a location of the device as a function of the received signals;
  memory accessible by the processor for storing navigation data used by the processor, the navigation data including data representative of a destination address;
  a local area network receiver; and
  a portable handheld housing for housing the GPS receiver, the processor, the memory, and the local area network receiver, and a personal digital assistant (PDA) including—
  an input for permitting entry of the destination address, and
  a transmitter for transmitting data representative of the destination address to the local area network receiver of the GPS device via a communication method selected from the group consisting of infra-red signaling and bluetooth communications.

47. A method of navigating using a portable handheld navigation device, the method comprising the steps of:

determining a current location of the device using GPS technology;

receiving data representative of a destination address from a personal digital assistant which wirelessly transmits the data to the device via a local area wireless communication;

calculating a route between the current location of the device and the destination address; and displaying the route on a display of the navigation device so that a user of the device may navigate to the destination address.

48. The method as set forth in claim 47, wherein the local area wireless communications is selected from the group consisting of infra-red signaling and bluetooth communications.

49. A navigation device comprising:

a GPS receiver for receiving signals from a plurality of satellites;

a processor with the GPS receiver for calculating a location of the device as a function of the received signals and for calculating a route along throughfares based on navigation data, the navigation data including the location of the device and a destination address;

a receiver accessible by the processor for storing the navigation data;

a receiver coupled with the processor for receiving the destination address from a portable electronic device via local area wireless communications; and a portable handheld housing for housing the GPS receiver, the processor, the memory, and the receiver.

50. A navigation system comprising:

a GPS device including—
  a GPS receiver for receiving signals from a plurality of GPS satellites;
  a processor coupled with the GPS receiver for calculating a location of the device as a function of the received signals and for calculating a route along thoroughfares based on navigation data, the navigation data including the location of the device and a destination address;
  memory accessible by the processor for storing the navigation data;
  a local area network receiver, and
  a portable handheld housing for housing the GPS receiver, the processor, the memory, and the local area network receiver; and a personal digital assistant (PDA) including—
  an input for permitting entry of the destination address, and
  a transmitter for transmitting the destination address to the local area network receiver of the GPS device via a communication method selected from the group consisting of infra-red signaling and bluetooth communications.

* * * * *